Nov. 11, 1930.  B. H. RYLEY  1,781,652
METHOD OF AND MEANS FOR TREATING THE FILTER
CAKE PRODUCED FROM CONTINUOUS FILTERS
Filed May 4, 1928   2 Sheets-Sheet 1
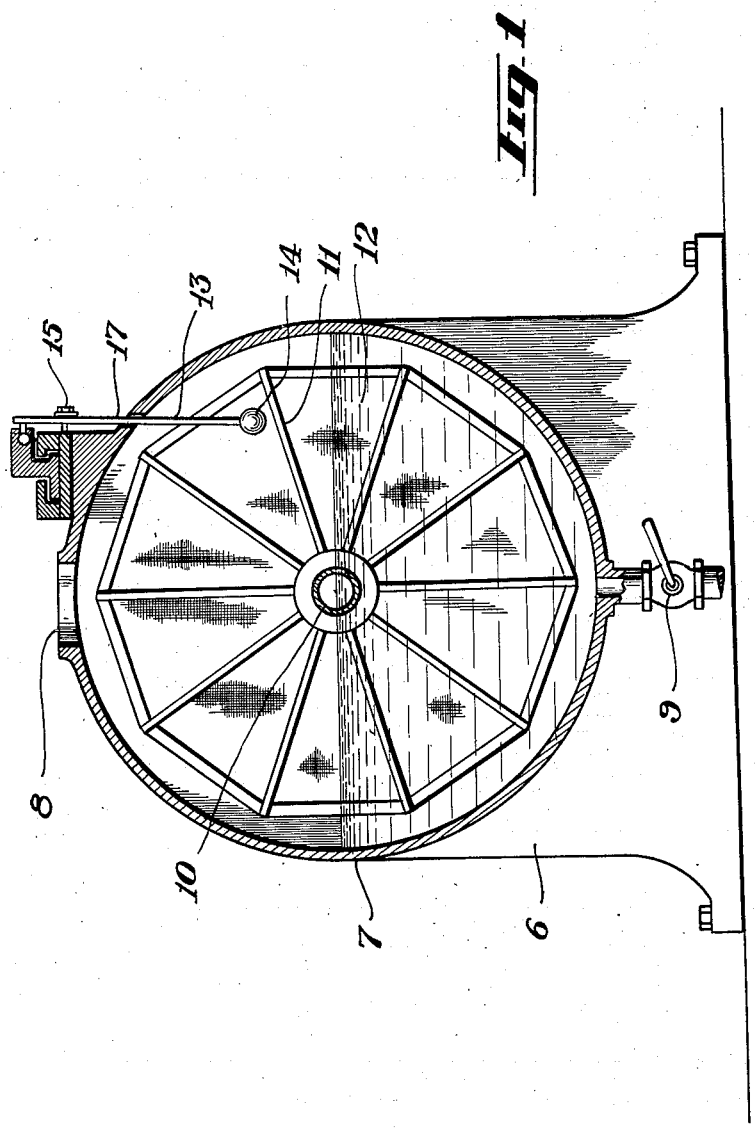
INVENTOR
Bertram. H. Ryley
By Wm. S. Fowler,
Attorney

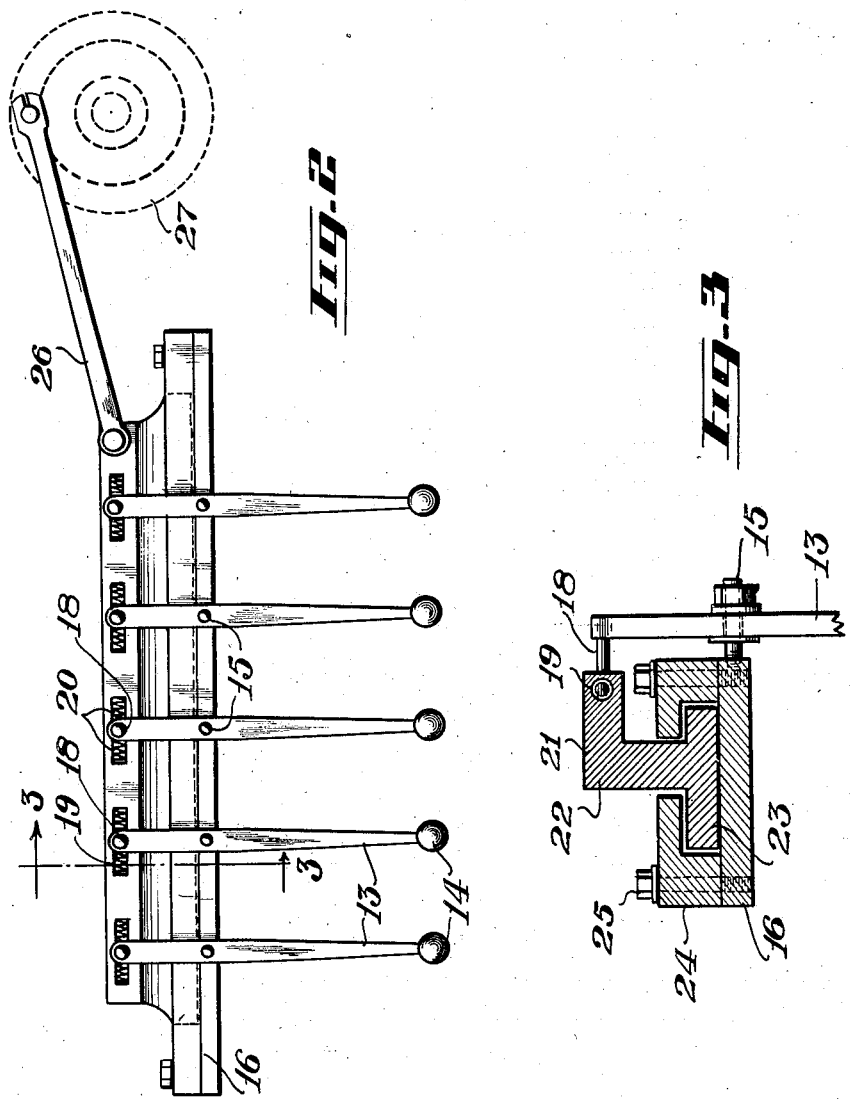

Patented Nov. 11, 1930

1,781,652

UNITED STATES PATENT OFFICE

BERTRAM HURST RYLEY, OF MOYIE, BRITISH COLUMBIA, CANADA

METHOD OF AND MEANS FOR TREATING THE FILTER CAKE PRODUCED FROM CONTINUOUS FILTERS

Application filed May 4, 1928. Serial No. 275,147.

This present invention relates to new and useful improvements in a method of and means for treating the filter cake produced from continuous filters and has for its primary object, the provision of means for setting up a vibration in the sections or segments of the filter drum whereby a drier or cleaner filter cake is assured.

Another object of the invention resides in the provision of simple and efficient means for tapping, beating or pressing the filter cake produced from continuous filters, such as are used in metallurgical and other similar processes, where the removal of the liquid portion of the pulp is necessary.

A further object of the invention resides in the provision of simple and inexpensive means for beating or pressing the filter cake after the latter is withdrawn from the pulp, in a filter employing a vacuum and compressed air to discharge the product.

A still further object resides in the provision of a simple arrangement of beating or pressing members with automatic operating means whereby the filter cakes will be discharged in a drier and cleaner condition, owing to the beating or pressing thereof, after they are withdrawn from the pulp.

A still further object of the invention resides in the provision of a method and means of beating or pressing the filter cakes which may be readily incorporated in the types of filters now in general use in metallurgical and like processes.

To the accomplishment of these and related objects, as will become apparent as the description proceeds, my invention resides in the construction, combination and arrangement of parts as shall be hereinafter more fully described, illustrated in the accompanying drawings and pointed out in the claims hereunto appended.

The invention will be best understood and can be more clearly described when reference is had to the drawings forming a part of this disclosure, wherein like characters indicate like parts throughout the several views.

In the drawings:—

Figure 1 is a vertical transverse section through a conventional type of filter with one form or embodiment of the beating or pressing means incorporated therein.

Figure 2 is an elevation of the beating or pressing means shown in Figure 1.

Figure 3 is a detail transverse section, taken substantially on the plane of line 3—3 of Figure 2, looking in the direction indicated by the arrows.

Referring more in detail to the drawings, it is to be noted that a base 6 is disclosed, with the filter tank 7 supported thereon and having an inlet 8 for the filtrate and a valved discharge 9 at its lower portion for the foreign matter or residue. The longitudinal central hollow shaft 10 rotating in the filter tank 7 carries the filter drums 11 built up of segmental sections 12 and which pass through the pulp and are withdrawn therefrom, on each revolution of the drums.

In the form or embodiment of the invention disclosed in the drawings, a plurality of beater or presser bars 13 are employed, with enlarged rounded operating ends 14 which operate against the opposite sides of the drum segments or sections 12 having the filter cakes therein. The bars 13 are pivoted near their upper ends on the supporting pins or studs 15 projecting from one side of the stationary guide channel frame 16 which extends longitudinally above the filter tank 7, the bars 13 depending and working through an elongated slot 17, as shown in Figure 1. Projecting laterally from the upper ends of the bars 13, are studs 18, each of which works in an elongated slot 19 and between a pair of cushioning springs 20, in the respective slots 19. The slots 19 are provided in the upper angularly extended side flange 21 of the slide bar 22 which slides or reciprocates on the stationary guide channel frame 16, with oppositely extended bottom flanges 23 working in the guide flanges 24 removably secured on the stationary guide channel 16, by suitable securing means 25. The slide bar 22 is operated by a pitman rod 26 connected to one end thereof and to a driving crank wheel 27.

As the construction of the device has thus been described in detail, brief reference is now had to its use and modus operandi: During the operation of the filter, the slide bar 22 is reciprocated and thus causes rocking of the bars 13 to deal repeated blows on the sides of the several segments or sections 12 of the filter drums 11, as said segments or sections are withdrawn from the filtrate. The springs 20 serve to absorb the shocks of the blows and assure the highest efficiency of operation and the best results from the gentle vibration of the drum segments or sections.

This method and means of setting up a vibration in the filter drums 11, during operation of the filter has two effects, depending on the point at which the cake is beaten or pressed. If the beating or pressing takes place as soon as possible after the cake has left the pulp, the result is shown in there being a drier cake, due to allowing a freer passage of air through the cake, thereby carrying off more moisture. If, on the other hand, the beating takes place at the point where the vacuum has been shut off and the compressed air has been admitted to discharge the filter cake, then the cake falls off and discharges in a much cleaner manner and the pores in the filter canvas are in a more suitable condition to receive the pulp in the next sequence of operation of the filter. The beating or pressing is the essential feature and may be effected by any suitable mechanical means such as that shown or cams, a toggle motion, eccentrics, an electric solenoid or magnet, or any other well known or preferred means for obtaining a vibratory motion.

From the foregoing description taken in connection with the accompanying drawings, it will be manifest that a method of and means for treating the filter cake produced from continuous filters is provided that will fulfill all the necessary requirements of such a device; but as many changes could be made in the above description and many widely different embodiments of my invention constructed within the scope of the appended claims without departing from the spirit or scope thereof, it is intended that all matters contained in the said accompanying specification and drawings shall be interpreted as illustrative and not in a limited sense.

Having thus described my invention, what I claim as new and desire to secure by Letters Patent is:—

1. An apparatus for treating filter cake produced from continuous filters including a pulp containing tank; a shaft within said tank; a drum carried on said shaft and rotatable in said tank; an oscillating member operable on said tank for striking the head of said drum and setting up transverse vibrations therein as the drum is withdrawn from the pulp; a slide block operable on said tank; resilient connections between said oscillating beating member and said slide block to operate the former from the latter; and operating means for said slide block.

2. An apparatus for treating the filter cake produced from continuous filters including a pulp containing tank; a shaft within said tank; a plurality of drums carried on said shaft and operable through the pulp in said tank; a series of oscillating beating members carried by and operable through said tank to beat on the heads of the respective drums and set up transverse vibrations therein as they withdraw from the pulp in said tank; a single slide block operable on said tank; resilient connections between said slide block and each of said oscillating beating members; and driving means for said slide block.

In testimony whereof I hereunto affix my signature.

BERTRAM HURST RYLEY. [L. S.]